Patented Apr. 15, 1930

1,754,651

UNITED STATES PATENT OFFICE

PHILIP SCHIDROWITZ, OF LONDON, ENGLAND, ASSIGNOR OF ONE-HALF TO JAMES B. CROCKETT, OF CAMBRIDGE, MASSACHUSETTS

METHOD OF TREATING CASEIN AND PRODUCT OF SAID METHOD

No Drawing.    Application filed December 8, 1928. Serial No. 324,805.

This invention relates to an improved method of treating casein and to a new product resulting therefrom.

The composition of casein and various methods of producing same from cow's milk are well understood in the art. It is a colloidal substance resembling albumen in its general constitution.

In making casein solutions by prior methods, the dry casein has been first softened by the addition of water and subsequently dissolved by adding an alkali such as sodium sulphite, borax, caustic soda, or ammonia. Heating of the mix causes liquefaction, but upon cooling it will set into a hard, stiff jell analogous in condition with glue and requires reheating for subsequent use in liquid form.

The present invention has for one of its principal objects the preparation of a casein solution which shall have the important characteristic of retaining its liquid condition at normal and low temperatures.

To this end, I have treated casein by an improved method, of which a specific example is hereinafter set forth with the understanding that the proportions and temperatures given are for illustrative purposes and not absolute or limiting upon the scope of the invention as defined in the appended claims.

According to a preferred method, 220 cubic centimeters of water are added to 50 grams of casein and allowed to stand for several hours. The time depends upon the temperature of the water and the fineness of grinding of the casein. The time should be sufficient to thoroughly moisten the casein particles, without, however, allowing them to cohere in dense sticky masses. After the casein has been soaked, approximately 6 cubic centimeters of 26° ammonia are added and the whole is placed in a water bath and heated at a temperature ranging from 60° C. to 80° C. Before the solution cools, or more particularly while it is in a partly cooled or just fluid state, 1 to 3 cubic centimeters of commercial piperidine ($C_5H_{11}N$) are added. Piperidine is an organic substance of basic character and when added, as above stated, it has the effect of maintaining the casein solution in the liquid condition obtained by heating the casein in the ammonia solvent.

The resultant fluid product finds particular application as an ingredient in cold solutions, dispersions, emulsions, and other liquid products wherein protective colloidal action is required. It is valuable for wetting dry powders which are to be mixed with rubber latex, and for use as an adhesive where ordinary casein solutions are used but cause technical difficulties on account of gelling.

What I claim is:

1. A fluid alkaline solution of casein containing piperidine.

2. A cold solution comprising casein, an alkali, and a relatively small amount of piperidine.

3. The method of treating casein to convert the same and maintain it in a fluid state when cold, which consists in dissolving the casein in alkaline solution and adding piperidine.

4. The method of treating casein to convert the same and maintain it in a fluid state when cold, which consists in adding an alkali to the casein, heating the alkali and casein, and adding piperidine before the liquefying effect of the heating has been terminated.

PHILIP SCHIDROWITZ.